Dec. 12, 1933.  J. CHRISTIE  1,939,203
SELF ERECTING FRONT CAMERA
Filed Dec. 12, 1932
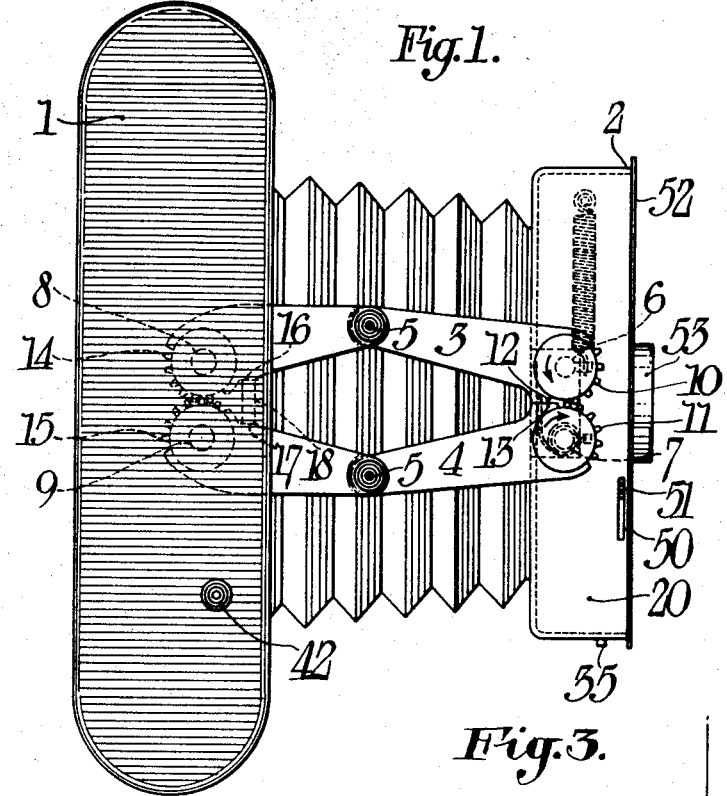
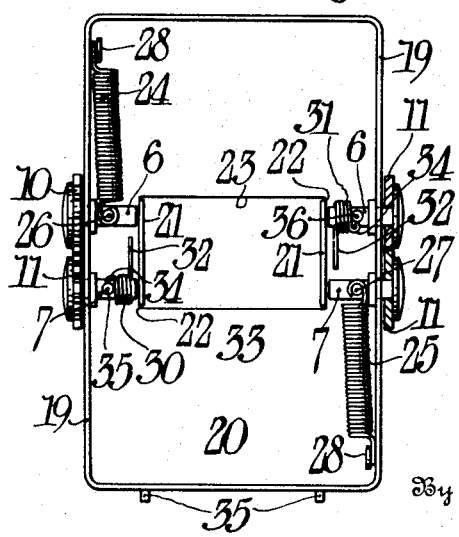
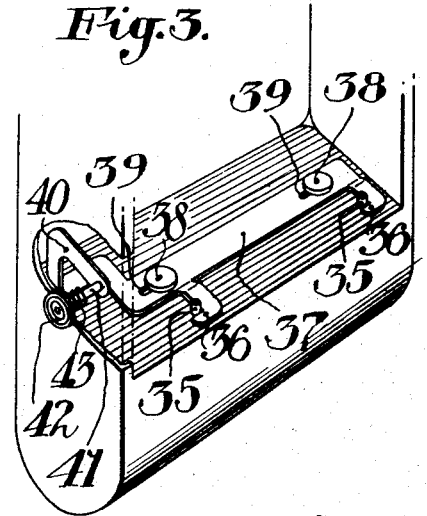
Inventor:
John Christie,
Newton M. Penn
Donald H. Stewart,
Attorneys.

Patented Dec. 12, 1933

1,939,203

UNITED STATES PATENT OFFICE 1,939,203

SELF-ERECTING FRONT CAMERA

John Christie, Rochester, N. Y., assignor to Eastman Kodak Company, Rochester, N. Y., a corporation of New York Application December 12, 1932
Serial No. 646,779

9 Claims. (Cl. 95—39)

This invention relates to photography and more particularly to photographic cameras. One object of my invention is to provide a camera in which the front will automatically spring out into picture-taking position when a latch is released. Another object of my invention is to provide a camera of the type described in which the springs for actuating the front of the camera are carried in a box-like member at the front of the camera. Another object of my invention is to provide a series of springs for actuating the camera front so arranged that the springs will always exert an erecting force upon the camera front. Another object of my invention is to provide a suitable support for the springs and erecting mechanism. Still another objective of my invention is to provide an inexpensive construction in which the housing containing the springs and shafts for hinged arms carrying the camera front is made of but few and simple pieces and other objects will appear from the following specification, the novel features being particularly pointed out in the claims at the end thereof.

Coming now to the drawing wherein like reference characters denote like parts throughout;

Fig. 1 is a side elevation of a camera constructed in accordance with and embodying a preferred form of my invention;

Fig. 2 is a front plan view of the front of a camera with the cover plate removed; and Fig. 3 is a fragmentary perspective view of a part of the camera carrying the latch mechanism.

My present invention relates to a camera of the type in which the front is projected forwardly by means of springs when a latch which may hold the front against the camera body is released.

As indicated in Fig. 1 the camera may comprise a body portion 1 and a front portion 2, these two portions being connected together by means of pairs of hinged legs 3 and 4.

The hinged legs are pivoted to each other at 5 to the camera front by the shaft 6 and 7 and to the camera back by shafts 8 and 9. In order to make the legs move together and to the same extent the front end of the legs is provided with the gear segments 10 and 11 which are shaped so as to mesh with each other and which terminate in shoulders 12 and 13 adapted to contact with each other and to form stops limiting the movement of the legs about the shafts 6 and 7 in the direction shown by the arrows. The hinged legs 3 and 4 are also provided with gear formings 14 and 15 about the pivots 8 and 9, these gear segments also meshing and terminating in shoulders 16 and 17 which by striking a stop 18 limit the movements of these arms.

In order to hold the camera front in the erect or picture-taking position shown in Fig. 1, the springs best shown in Fig. 2, are utilized. As indicated in Fig. 2 the shafts 6 and 7 are supported in two sets of bearings, one set of bearings being provided in the flanges 19 which form the sides of the shallow box-like receptacle 20 which carries the spring mechanism and the other set being formed in the flanges 21 bent up from the edges 22 of an opening 23 formed in the center of the box-like receptacle. Between the bearings in the walls 19 and 21 there are two sets of springs, one set of springs 24 and 25 are coiled springs attached to posts 26 and 27 carried by the shafts 6 and 7 at one end and attached to studs 28 at the other end. These springs are coiled springs of considerable length and consequently they exert a comparatively even tension on the hinged arms at all times since during the opening and closing movements of the camera front relative to the body the pins 26 and 27 only turn approximately 90°.

The second set of springs comprises coil springs 30 and 31 each having an end 32 resting against the bottom 33 of the box-like receptacle and each having an end 34 attached to a stud 35 or 36 carried by the shafts 6 and 7. These springs are comparatively short springs and exert a considerable torque on these shafts during the first part of the opening movement. Thus the front is given an additional impulse to start the opening movement and the springs 24 and 25 continue the movement of the front when started by the springs 30 and 31. The shafts 6 and 7 are geared together as above explained by the gear segments 10 and 11 and consequently the springs above described act on the hinged arms 3 and 4 to a like extent.

Since the tendency of these springs is to thrust the front of the camera outwardly into a picture-taking position it is necessary to restrain the movement of the springs when the camera is closed. Consequently I provide on the bottom of the box-like structure a pair of latching pins 34 which as best shown in Fig. 3 are adapted to contact and be held by the hooks 36 which are integrally formed on an arm 37 mounted to slide on the studs 38, which are carried by the camera body and which extend up through the slots 39. The arm 37 is formed upwardly and outwardly at 40 and a pin 41 extends through the camera casing and terminates in a finger piece 42 which is normally thrust outwardly by means of the coil spring 43 bearing against the stud 42 and the camera wall. As soon as the push button 42 is pressed inwardly releasing the pins 35 the camera front will spring open into the position shown.

The box-like casing 20 is preferably provided with a slot 50 through which a shutter trigger 51 may extend and is provided with a cover plate 52 which may carry the usual objective mount 53.

There are quite a number of advantages in providing the spring operating mechanism for the self-erecting front in the front of the camera because these springs are very accessible and by removing the shutter cover plate 52 they can be easily adjusted or repaired. Moreover, with a shallow box-like front as shown there is sufficient room for the springs for pairs of bearings which will adequately support the front shafts of the hinged arms 3 and 4 and which will also provide room for a shutter. While the shutter is not shown in the present drawing, it is understood that it may lie between the flanges 21 over the opening 23 in such a manner that light passing through the objective passes through the opening 23.

With the camera as above described the springs always exert a constant torque on the arm shafts so that the camera will normally be held in an opened or picture-taking position. When the camera is closed the locking pins 35 are engaged by the hooks 36 to hold the front against the tension of these springs. It is, therefore, only necessary to press the button 42 to cause the camera to open up into a picture-taking position.

While I have described a preferred embodiment of my invention it is quite obvious various changes in the arrangement of parts may be made without departing from my invention. I, therefore, contemplate as within the scope of my invention all such changes as may come within the appended claims.

What I claim is:

1. In a self-erecting front camera, the combination with a camera body, of a front, hinged legs movably connected to the camera body and to the front and adapted to move on their hinges when the front is moved with respect to the camera body, gearing connecting the ends of the hinged legs for moving said legs together, and a spring connected to one leg for exerting a relatively constant torque thereon and through the said gearing to both legs, and a latch for retaining the front folded against the camera body against the torque on said legs.

2. In a self-erecting front camera, the combination with a camera body, of a front, hinged legs movably connected to the camera body and to the front and adapted to move on their hinges when the front is moved with respect to the camera body, gearing connecting the ends of the hinged legs for moving said legs together, and a spring carried by the front and connected to one leg for exerting a relatively constant torque thereon and through the said gearing to both legs, and a latch for retaining the front folded against the camera body against the torque on said legs.

3. In a self-erecting front camera, the combination with a camera body, of a front, hinged legs movably connected to the camera body and to the front and adapted to move on their hinges when the front is moved with respect to the camera body, gearing connecting the ends of the hinged legs for moving said legs together, a pair of spaced bearings carried by the front, a shaft supported by said bearings, a hinged leg fixedly attached to said shaft, and a spring connected to said shaft between said bearings for exerting a constant torque on said shaft.

4. In a self-erecting front camera, the combination with a camera body, of a front, hinged legs movably connected to the camera body and to the front and adapted to move on their hinges when the front is moved with respect to the camera body, gearing connecting the ends of the hinged legs for moving said legs together, a pair of spaced bearings carried by the front, a shaft supported by said bearings, a hinged leg fixedly attached to said shaft, and an arm carried by the shaft and extending therefrom between the bearings, a spring connected to the arm and to the front for exerting a substantially constant torque in one direction on said shaft.

5. In a self-erecting front camera, the combination with a camera body, of a front, hinged legs movably connected to the camera body and to the front and adapted to move on their hinges when the front is moved with respect to the camera body, gearing connecting the ends of the hinged legs for moving said legs together, said camera front comprising a box-like housing, a bracket carried by the housing forming pairs of bearings, shafts mounted in said bearings and carrying said hinged arms, springs connected to the front and certain of said shafts and exerting a torque on one of said shafts, whereby said camera front may be projected from the camera body to a picture taking position, and a latch between the camera front and body for retaining said front in a closed position against the action of said springs.

6. In a self-erecting front camera, the combination with a camera body, of a front, a plurality of hinged legs connected to the front and to the camera body on which said front may move to and from said body, a pair of spaced bearings on said front, a shaft supported in said bearings, a spring located between said bearings adapted to exert a torque on said shaft, said shaft supporting one end of one of said hinged legs whereby said leg may tend to move the camera front from said body, and gearing between the ends of the plurality of legs through which said legs move together.

7. In a self-erecting front camera, the combination with a camera body, of a front, hinged legs movably connected to the camera body and to the front and adapted to move on their hinges when the front is moved with respect to the camera body, springs attached to the hinged legs for moving the legs to position the camera front spaced from the body for making an exposure, at least one of said springs exerting a relatively light torque on a leg throughout the movement of said legs, and at least one of said springs being comparatively strong and short relative to the first mentioned spring and adapted to exert its greatest force at the start of the opening movement.

8. In a self-erecting front camera, the combination with a camera body, of a front, and operable connections between the front and body upon which the parts may move to and from a picture taking position, springs acting on said operable connections and adapted to space the camera front from the body for taking pictures, said springs including a short heavy spring for starting the opening movement and a long light spring for continuing the movement started by the first spring.

9. In a self-erecting front camera, the combination with a camera body, of a front, and operable connections between the front and body upon which the parts may move to and from a picture taking position, springs acting on said operable connections and adapted to space the camera front from the body for taking pictures, said springs including a short heavy spring for starting the opening movement and a long light spring for continuing the movement and a mount for both of said springs carried by the camera front.

JOHN CHRISTIE.